United States Patent [19]

Sato et al.

[11] Patent Number: 4,524,369
[45] Date of Patent: Jun. 18, 1985

[54] PLASTIC INFORMATION-RECORDING MEDIUM

[75] Inventors: Masaaki Sato; Aizo Kaneda; Makio Watanabe, all of Yokohama, Japan

[73] Assignee: Hitachi, Ltd., Tokyo, Japan

[21] Appl. No.: 391,374

[22] Filed: Jun. 23, 1982

[30] Foreign Application Priority Data

Aug. 21, 1981 [JP] Japan ................. 56-130235

[51] Int. Cl.$^3$ ............................. G01D 15/34
[52] U.S. Cl. ................. 346/135.1; 346/76 L; 369/283; 369/284
[58] Field of Search ........... 346/135.1, 137, 76 L; 369/283, 284, 88; 430/495

[56] References Cited

U.S. PATENT DOCUMENTS 4,074,282 2/1978 Balas, Jr. et al. ............ 346/76 L
4,373,004 2/1983 Asano et al. ................ 346/76 L
4,414,273 11/1983 Wada et al. ................. 346/76 L Primary Examiner—A. D. Pellinen
Assistant Examiner—Todd E. DeBoer
Attorney, Agent, or Firm—Antonelli, Terry & Wands

[57] ABSTRACT

A plastic information-recording medium comprises a pair of juxtaposed transparent plastic substrates molded from a composition, which is comprised of a copolymer consisting of 5 to 25% by weight of acrylonitrile or methacrylonitrile and 95 to 75% by weight of at least one of other monomers copolymerizable with acrylonitrile or methacrylonitrile than styrene or a styrene derivative, or a composition comprising at least 70% by weight of the copolymer and at most 30% by weight of butadiene rubber, and has a clearance between the substrates, the clearance being gas-tightly blocked from an outside atmosphere by joining the substrates together at peripheral edges thereof, and a recording film being provided on each of clearance-facing sides of the substrates.

9 Claims, 2 Drawing Figures

PLASTIC INFORMATION-RECORDING MEDIUM

BACKGROUND OF THE INVENTION

This invention relates to an information-recording medium capable of recording and reproducing by a convergent beam of light.

BRIEF DESCRIPTION OF THE PRIOR ART

A disk-type information-recording medium capable of recording and reproducing by a convergent beam of light has such a structure that a pair of doughnut-type, transparent plastic substrates are juxtaposed with a predetermined clearance by means of an annular spacer so that the substrate surfaces provided with tracking grooves and information pits can face each other to form a clearance therebetween, and recording films are provided on the clearance-faced substrate surfaces. The tracking grooves and information pits are directly formed on the substrate surfaces by injection molding or press molding by means of a stamper.

Polymethyl methacrylate, polycarbonate, etc. are used for the transparent plastic substrate, and compositions containing tellurium (Te) or tellurium and selenium (Se) as the major component are used for the recording film. The recording film is very liable to crack by an action of moisture. When the information-recording medium is left in a humid atmosphere for a long time, the humidity in the clearance is equal to that of the surrounding humid atmosphere, and the recording film cracks during the use, and the function as the information-recording medium is lost. Thus, the life of recording and reproducing is very short in the conventional plastic information-recording medium.

SUMMARY OF THE INVENTION

An object of the present invention is to provide a plastic information-recording medium having a satisfactorily long life of recording and reproducing, which is free from the said disadvantages of the conventional plastic information-recording medium.

The present invention is characterized by using a plastic having a nitrile group, which is free from styrene or a styrene derivative as a plastic substitute. The plastic having a nitrile group, which is free from styrene or a styrene group is a composition containing, as the major component, a copolymer consisting of 5 to 25% by weight of acrylonitrile or methacrylonitrile and 95 to 75% by weight of at least one monomer copolymerizable with acrylonitrile or methacrylonitrile, other than styrene or a styrene derivative. By using such plastic substrate, adhesiveness of the substrate to a recording film containing Te, or Te and Se as the major component can be improved, and the recording film can be prevented from cracking in the surrounding humid atmosphere. Thus, a plastic information-recording medium having a long life of recording and reproducing can be obtained.

In the present invention, the plastic having a nitrile group, which is free from styrene or a styrene derivative and is a composition comprised of a copolymer consisting of 5 to 25% by weight of acrylonitrile or methacrylonitrile and 95 to 75% by weight of at least one monomer copolymerizable with acrylonitrile or methacrylonitrile, other than styrene or a styrene derivative, or includes a composition comprising at least 70% by weight of the said copolymer and at most 30% by weight of butadiene rubber particles having particle sizes of not more than 300 nm, preferably 300–50 nm. The composition can contain a plasticizer, a stabilizer, a lubricant and a mold-releasing agent, if required.

The monomers copolymerizable with acrylonitrile or methacrylonitrile, other than styrene or a styrene derivative, include, for example, alkyl acrylate esters such as methyl acrylate, ethyl acrylate, propyl acrylate, etc., alkyl methacrylate esters such as methyl methacrylate, ethyl methacrylate, propyl methacrylate, etc., acrylamide, vinyl acetate, vinyl chloride, conjugated diene, etc.

When the content of acrylonitrile or methacrylonitrile in the copolymer is less than 5% by weight, the composition is less effective for preventing the cracking of the recording film, whereas the moisture absorption of the copolymer is large above 25% by weight due to the hygroscopic nitrile group, and the substrate is curved. The curved substrate is not preferable for an information-recording medium.

When more than 30% by weight of butadiene rubber is mixed with the said composition, the mechanical strength of the resulting plastic is too low to serve for the practical purpose.

In the present invention, a plastic having a transmittance of a convergent beam of light (830 nm) being at least 60% per mm of the thickness of a molding or a retardation (index of double refraction × thickness) of a convergent beam of light (830 nm) being not more than 60 nm per mm of the thickness of a molding is particularly effective as a substrate material, because the recording and reproducing of a plastic information-recording medium are carried out with a convergent beam of light through the plastic substrate, and if the transmittance or the retardation of a convergent beam of light fails to fall within the said range, the recording and reproducing will be hard to carry out.

A plastic containing a copolymer of styrene with acrylonitrile or methacrylonitrile as the major component has a larger retardation, so that it cannot be used as a plastic substrate.

A substrate having tracking grooves and information pits is prepared by melting the said composition at a cylinder temperature of 200° C. to 300° C., filling the cavities on a mold having a stamper with tracking grooves and information pits on the surface by injection under an injection pressure of 300–600 kg/cm², cooling and releasing the resulting molding from the mold.

The recording film containing Te or Te and Se as the major components for use in the present invention is prepared from Te, a mixture of Te and Se, or a mixture of Te and Se with at least one of arsenic (As), titanium (Ti), lead (Pb), indium (In), cadmium (Cd), etc.

DETAILED DESCRIPTION OF THE PREFERRED EMBODIMENTS

EXAMPLE 1

A positive type photoresist (AZ 1350J: trademark of a product made by Shipley Co., Inc. U. S. A.) having a thickness corresponding to one-fourth of the wavelength which a reading light has when it is made to pass through a medium having a refractive index of about 1.5, was coated onto a glass plate disk having a diameter of 355 mm and a thickness of 10 mm by a spinner, and an argon ion laser beam (wavelength: 4579Å) was converged and irradiated onto the disk while rotating the disk around the center at 1,800 rpm. The power of irradiating laser beam was adjusted so as to provide grooves having a depth equal to about one-half ($\frac{1}{2}$ of the wavelength) of the film and pits having a depth equal to the thickness of the film when the photoresist was to be developed. Then the photoresist was developed, and pits having a depth equal to one-fourth of the wavelength and grooves having a depth equal to $\frac{1}{8}$ of the wavelength were prepared thereby. Then, the disk was baked at 120° C. for one hour, and a nickel film was prepared on the surface by nickel mirror reaction. Then, a nickel plating was deposited on the nickel film from a nickel sulfamate solution (SN Conc, trademark of a product made by Harshow-Murata, Japan) at a bath temperature of 50° C. and a current density of 10 A/dm$^2$. Then, the plating layer was peeled off, and the photoresist transferred to the plating layer was removed by dissolving it in acetone, whereby a stamper was obtained.

Figure 1:
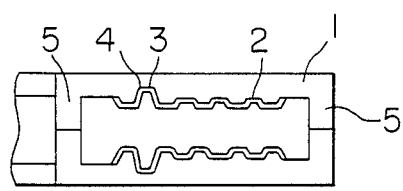
FIGS. 1 and 2 are cross-sectional views of plastic information-recording medium.

The resulting stamper was provided at the inside of a mold for injection molding, and compositions containing copolymers as the major component shown as Samples Nos. 1–6 and 8–11 in the following Table were molded in the said mold at an injection pressure of 450 kg/cm$^2$ and a cylinder temperature of 250° C. to obtain doughnut-type substrates, 300 mm in outer diameter, 70 mm in inner diameter, and 1.2 mm in thickness, with spacer members 5 having a height of 0.5 mm at the inner and outer peripheral edges, as shown in FIG. 1. These substrates had tracking grooves 2 having a depth of one-fourth of the wavelength and information pits 3 having a depth of $\frac{1}{8}$ of the wavelength on one side. The transmittance of the substrates at wavelength of 830 nm are shown in the following Table for samples Nos. 1–6 and 8–11.

Then, the substrates were each placed in a vacuum vapor deposition apparatus to form a recording film 4 containing 94% by weight of Te and 6% by weight of Se and a thickness of 40 nm on the surfaces having the tracking grooves and the information pits.

Then, a pair of substrates having the recording films were joined together at the spacer members by coating the spacer members with an epoxy resin adhesive of reduced moisture permeability containing 50% by volume of SiO$_2$, and bonding the counterfaced spacer members by heating to 20°–70° C. for 2–24 hours under pressure, whereby information-recording media were prepared.

Retardation of the information-recording media thus prepared and cracking of the recording films were investigated 1,000 hours after exposure to 80° C. and 90% RH. The results are shown in the following Table. Samples Nos. 1–6 had no abnormality and no problem in recording and reproduction, whereas Samples Nos. 8–11 had some abnormality and could not perform recording and reproduction.

Recording of information-recording media thus prepared was carried out in the following manner:

First of all, the information-recording medium was made to turn at 240 rpm, and a semi-conductor laser beam having a wavelength of 830 nm was converged onto the information-recording medium through a lens. Light spot was controlled to be focused always in the groove owing to a diffraction effect from the groove having a depth of $\frac{1}{8}$ of the wavelength, and the output of laser was increased at a predetermined position to change the intensity in accordance with signals and to perform recording. The parts, at which a stronger laser beam hit, were pitted on the recording film of Te and Se, and thus got recording.

Recording was read out in the same manner as in recording by maintaining a light spot on a desired track and detecting changes in the intensity of reflected light with a powder that was not susceptible to recording.

EXAMPLE 2

Figure 2:
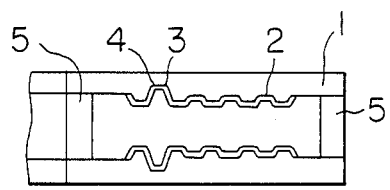

Doughnut-type disks having compositions of Samples Nos. 7, 12 and 13 in the following Table were heated to 110° C. and embossed by means of the same stamper as used in Example 1 to form tracking grooves 2 having a depth of one-fourth of the wavelength and information pits 3 of $\frac{1}{8}$ of the wavelength on one side of the disks, as shown in FIG. 2. Thus, substrates at wavelength of 830 nm are shown as Nos. 7, 12 and 13 in the Table.

A recording film 4 was formed at the side of the substrate 1, at which the tracking grooves and information pits were formed. The recording film was formed from a material of Te:Se:Pb=84:6:10 in wt. % in the same manner as in Example 1.

A pair of substrates each having the recording film were joined together with an epoxy adhesive through aluminum spacers 5 having a height of 1 mm in the same manner as in Example 1, whereby an information-recording medium, whose recording films were counterfaced to each other, was obtained.

Retardation of information-recording media thus prepared and cracking of the recording films were investigated 1,000 hours after exposure to 80° C. and 95%/RH. The results are shown in the Table, as is obvious from Sample No. 7, had no abnormality and no problem in recording and reproduction, whereas Sample Nos. 12 and 13 had abnormality and could not perform recording and reproduction.

Recording and reading of the information-recording media thus prepared were carried out in the same manner as in Example 1.

TABLE

| Item | | Sample No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Composition (wt. %) | | | | | | | | | | | | | | |
| Copolymer components | Acrylonitrile | 5 | 15 | 20 | 25 | 15 | 15 | 20 | 20 | 3 | 30 | 25 | 20 | — |
| | Methyl methacrylate | 85 | 75 | 72 | 65 | 75 | 80 | — | 55 | 87 | 60 | — | 60 | 70 |
| | Methyl acrylate | 10 | 10 | 8 | 10 | — | — | — | — | 10 | 10 | — | — | — |
| | Ethyl acrylate | — | — | — | — | 10 | — | — | — | — | — | — | — | — |
| | Acrylic acid | — | — | — | — | — | 5 | — | — | — | — | — | — | — |
| | Vinyl acetate | — | — | — | — | — | — | 80 | — | — | — | — | — | — |
| | Styrene | — | — | — | — | — | — | — | — | — | — | 75 | 20 | 30 |
| Butadiene rubber | | — | — | — | — | — | — | — | 25 | — | — | — | — | — |

TABLE-continued

| Item | | Sample No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| (max particle size 300 nm) | | | | | | | | | | | | | | |
| Characteristics of information-recording medium | Transmittance (%, at wavelength of 830 nm) | 93 | 91 | 91 | 90 | 91 | 91 | 87 | 84 | 93 | 90 | 89 | 75 | 88 |
| | Retardation[*1] | o | o | o | o | o | o | o | o | o | o | x | x | x |
| | Curving by moisture[*2] | o | o | o | o | o | o | o | o | o | x | o | o | o |
| | Cracking of recording film[*3] | o | o | o | o | o | o | o | o | x | o | o | o | x |

Remarks:
[*1] Mark "o" means low retardation with good reproduction, and mark "x" high retardation with difficult reproduction 1,000 hours after exposure to 80° C. and 95% RH.
[*2] Mark "o" means no curving, and mark "x" considerable curving by moisture absorption with difficult recording and reproduction under the same test conditions as in [*1].
[*3] Mark "o" means no cracking on the recording film, and mark "x" cracking with difficult recording and reproduction under the same test conditions as in [*1].

What is claimed is:

1. A plastic information-recording medium comprising a pair of juxtaposed transparent plastic substrates having a clearance between the substrates, the clearance being gas-tightly blocked from an outside atmosphere by joining the substrates together at peripheral edges thereof, and a recording film being provided on each of clearance-facing sides of the substrates, the substrates being made from: (1) a composition comprising a copolymer consisting of 5 to 25% by weight of acrylonitrile or methacrylonitrile and 95 to 75% by weight of at least one monomer copolymerizable with acrylonitrile or methacrylonitrile, said at least one monomer being a monomer other than styrene or a styrene derivative, or (2) a composition comprising at least 70% by weight of said copolymer and at most 30% by weight of butadiene rubber, whereby use of 5 to 25% by weight of acrylonitrile or methacrylonitrile in said copolymer is effective for preventing cracking of said recording film while also preventing curving of the substrate due to moisture absorption.

2. The plastic information-recording medium according to claim 1, wherein said substrates are joined together by an epoxy resin adhesive.

3. The plastic information-recording medium according to claim 1, wherein the recording film is comprised of 94% by weight of Te and 6% by weight of Se, or of 84% by weight of Te, 6% by weight of Se, and 10% by weight of Pb.

4. The plastic information-recording medium according to claim 1, wherein said at least one monomer copolymerizable with acrylonitrile or methacrylonitrile is at least one monomer selected from the group consisting of alkyl acrylate esters, alkyl methacrylate esters, alkylamides, vinyl acetate, vinyl chloride, and conjugated dienes.

5. The plastic information-recording medium according to claim 1, wherein the substrates are made from said composition comprising at least 70% by weight of said copolymer and at most 30% by weight of butadiene rubber, and wherein said butadiene rubber is in the form of particles, having a size of less than 300 nm.

6. The plastic information-recording medium according to claim 4, wherein said recording film contains Te as the main component, or Te and Se as the main components.

7. The plastic information-recording medium according to claim 5, wherein said recording film contains Te as the main component, or Te and Se as the main components.

8. The plastic information-recording medium according to claim 1, wherein said recording film contains Te as the main component, or Te and Se as the main components.

9. The plastic information-recording medium according to claim 1, wherein the substrates are made of a composition having a transmittance of a convergent beam of light of 830 nm of at least 60% per nm of the thickness of the substrate, or a retardation of a convergent beam of light of 830 nm of not more than 60 nm per mm of the thickness of the substrate.

* * * * *